(12) United States Patent
Neill (10) Patent No.: US 9,361,380 B2
(45) Date of Patent: Jun. 7, 2016

(54) SYSTEM AND ASSOCIATED METHODS FOR REMOTELY ENABLING FEATURES

(71) Applicant: CSC Holdings, LLC, Bethpage, NY (US)

(72) Inventor: Richard W. Neill, Syosset, NY (US)

(73) Assignee: CSC Holdings, LLC, Bethpage, NY (US)

( * ) Notice: Subject to any disclaimer, the term of this patent is extended or adjusted under 35 U.S.C. 154(b) by 0 days.

(21) Appl. No.: 14/059,762

(22) Filed: Oct. 22, 2013

(65) Prior Publication Data

US 2014/0074915 A1   Mar. 13, 2014

Related U.S. Application Data

(63) Continuation of application No. 12/721,847, filed on Mar. 11, 2010, now Pat. No. 8,626,733, which is a continuation of application No. 11/017,794, filed on Dec. 22, 2004, now Pat. No. 7,716,237.

(51) Int. Cl.
*G06F 17/30* (2006.01)
*G06F 9/445* (2006.01)
*H04L 29/08* (2006.01)

(52) U.S. Cl.
CPC ...... *G06F 17/30864* (2013.01); *G06F 9/44505* (2013.01); *G06F 17/30867* (2013.01); *H04L 67/10* (2013.01); *G06F 17/30067* (2013.01)

(58) Field of Classification Search
CPC .............. G06F 17/30; G06F 17/30864; G06F 17/30899; G06F 17/3087; G06F 17/30241; G06F 17/30386; G06F 17/30749; G06F 17/30793; G06F 17/30861; G06F 17/30867; G06F 17/30893; G06F 17/30035; G06F 17/30592; G06F 17/30887; G06F 17/3089; G06F 17/30914; G06F 17/5009
USPC ......................................... 707/705, 769, 821
See application file for complete search history.

(56) References Cited

U.S. PATENT DOCUMENTS

| | | | |
|---|---|---|---|
| 5,410,326 A | 4/1995 | Goldstein | |
| 5,517,257 A | 5/1996 | Dunn et al. | |
| 5,570,295 A | 10/1996 | Isenberg et al. | |
| 5,600,364 A | 2/1997 | Hendricks et al. | |
| 5,619,250 A | 4/1997 | McClellan et al. | |
| 5,630,119 A | 5/1997 | Aristides et al. | |
| 5,689,708 A * | 11/1997 | Regnier et al. | 395/682 |
| 5,708,709 A | 1/1998 | Rose | |
| 5,751,282 A | 5/1998 | Girard et al. | |
| 5,870,667 A | 2/1999 | Globuschutz | |

(Continued)

OTHER PUBLICATIONS

Bissel, R. A., et al., "The set-top box for interactive services", BT Technol. J., vol. 13, No. 4, Oct. 1995, pp. 66-77.

(Continued)

*Primary Examiner* — Jean M Corrielus
*Assistant Examiner* — Andalib Lodhi
(74) *Attorney, Agent, or Firm* — Goodwin Procter LLP (57) ABSTRACT

A method and apparatus enables a feature among a plurality of features in an application loaded on a client, with the client located remotely from a server. The server receives a data profile request from the client. In response to the data profile request, a data profile is sent from the server to the client, the data profile including a profile key to identify the client, an application identification to identify the application, and a feature selector. The application uses the feature selector to enable the feature among the plurality of features.

14 Claims, 5 Drawing Sheets

(56) References Cited

U.S. PATENT DOCUMENTS

| | | | |
|---|---|---|---|
| 5,883,956 A | 3/1999 | Le et al. | |
| 5,954,808 A | 9/1999 | Paul | |
| 5,982,363 A | 11/1999 | Naiff | |
| 5,990,927 A | 11/1999 | Hendricks et al. | |
| 6,020,863 A | 2/2000 | Taylor | |
| 6,134,549 A | 10/2000 | Regnier et al. | |
| 6,154,633 A | 11/2000 | Landgraf et al. | |
| 6,219,042 B1 | 4/2001 | Anderson et al. | |
| 6,259,443 B1 | 7/2001 | Williams, Jr. | |
| 6,324,578 B1 | 11/2001 | Cox et al. | |
| 6,351,773 B1 | 2/2002 | Fijolek et al. | |
| 6,425,125 B1 | 7/2002 | Fries et al. | |
| 6,556,659 B1 * | 4/2003 | Bowman-Amuah | 379/9.04 |
| 6,618,858 B1 | 9/2003 | Gautier | |
| 6,636,242 B2 | 10/2003 | Bowman-Amuah | |
| 6,678,733 B1 | 1/2004 | Brown et al. | |
| 6,704,776 B1 | 3/2004 | Fortune | |
| 6,718,374 B1 | 4/2004 | Del Sordo et al. | |
| 6,732,179 B1 | 5/2004 | Brown et al. | |
| 6,742,029 B2 | 5/2004 | Vasamsetti et al. | |
| 6,742,121 B1 | 5/2004 | Safadi | |
| 6,745,245 B1 | 6/2004 | Carpenter | |
| 6,775,713 B1 | 8/2004 | Liu et al. | |
| 6,813,778 B1 | 11/2004 | Poli et al. | |
| 6,915,525 B2 | 7/2005 | Ozawa | |
| 6,918,113 B2 | 7/2005 | Patel et al. | |
| 6,959,320 B2 | 10/2005 | Shah et al. | |
| 7,065,709 B2 | 6/2006 | Ellis et al. | |
| 7,117,482 B2 | 10/2006 | Nguyen et al. | |
| 7,394,457 B2 | 7/2008 | Adams et al. | |
| 7,546,956 B2 | 6/2009 | Adams et al. | |
| 7,552,192 B2 | 6/2009 | Carmichael | |
| 7,631,325 B2 * | 12/2009 | Rys et al. | 725/25 |
| 7,681,043 B1 | 3/2010 | Carr | |
| 7,693,161 B2 | 4/2010 | Sung | |
| 7,904,933 B2 | 3/2011 | Crinon et al. | |
| 7,987,228 B2 | 7/2011 | McKeown et al. | |
| 8,015,271 B2 | 9/2011 | McKeown et al. | |
| 8,042,132 B2 | 10/2011 | Carney et al. | |
| 8,060,486 B2 * | 11/2011 | Chatterjee et al. | 707/705 |
| 8,302,111 B2 | 10/2012 | Ladd et al. | |
| 8,438,555 B1 * | 5/2013 | Bodine et al. | 717/167 |
| 8,638,676 B2 * | 1/2014 | George | H04L 65/1006 370/252 |
| 9,026,701 B2 * | 5/2015 | Finnerty | H04L 67/025 710/65 |
| 2002/0059594 A1 | 5/2002 | Rasmussen et al. | |
| 2002/0087883 A1 | 7/2002 | Wohlgemuth et al. | |
| 2002/0120932 A1 | 8/2002 | Schwalb | |
| 2002/0184652 A1 | 12/2002 | Cezeaux | |
| 2003/0084440 A1 | 5/2003 | Lownes | |
| 2003/0146940 A1 | 8/2003 | Ellis et al. | |
| 2003/0169289 A1 | 9/2003 | Holt et al. | |
| 2004/0054771 A1 | 3/2004 | Roe et al. | |
| 2004/0088176 A1 | 5/2004 | Rajamani | |
| 2004/0107439 A1 | 6/2004 | Hassell et al. | |
| 2004/0107443 A1 | 6/2004 | Clancy | |
| 2004/0193913 A1 | 9/2004 | Han et al. | |
| 2005/0027851 A1 | 2/2005 | McKeown et al. | |
| 2005/0028206 A1 | 2/2005 | Cameron et al. | |
| 2005/0097343 A1 | 5/2005 | Altenhofen | |
| 2005/0160473 A1 | 7/2005 | Gal-Oz | |
| 2005/0212504 A1 | 9/2005 | Revital et al. | |
| 2005/0235319 A1 * | 10/2005 | Carpenter | 725/52 |
| 2005/0235329 A1 | 10/2005 | Karaoguz et al. | |
| 2005/0273445 A1 * | 12/2005 | Steelberg et al. | 705/80 |
| 2006/0020993 A1 | 1/2006 | Hannum et al. | |
| 2006/0035631 A1 | 2/2006 | White et al. | |
| 2006/0101495 A1 | 5/2006 | Yoshida et al. | |
| 2007/0061488 A1 | 3/2007 | Alagappan et al. | |
| 2009/0133051 A1 * | 5/2009 | Hildreth | 725/28 |
| 2009/0217310 A1 | 8/2009 | Koretz | |
| 2010/0318731 A1 | 12/2010 | Murray | |

OTHER PUBLICATIONS

Chakravorty, Rajiv, et al., "Architecture and Implementation of a Remote Management Framework for Dynamically Reconfigurable Devices", ICON 2002, © 2002, pp. 375-380.

Cranor, Charles D., et al., "Enhanced Streaming Services in a Content Distribution Network", IEEE Internet Computing, Jul./Aug. 2001, pp. 66-75.

de Lange, Fons, "The Philips-Open TV Product Family Architecture for Interactive Set-Top Boxes", PFE-4 2001, LNCS 2290, Springer-Verlag, Berlin, Germany, © 2002, pp. 187-206.

Furht, Borko, et al., "An Innovative Internet Architecture for Application Service Providers", Proc. of the 33rd Hawaii International Conf. on System Sciences, Maui, HI, Jan. 4-7, 2000, pp. 1-10.

Lonczewski, Frank, et al., "An extensible Set-Top Box Architecture for interactive and broadcast Services offering sophisticated User Guidance", ICME 2000, New York, NY, vol. 3, © 2000, pp. 1403-1406.

Pekowsky, Stuart, et al., "The Set-Top Box as 'Multi-Media Terminal'", IEEE Transactions on Consumer Electronics, vol. 44, Issue 3, Aug. 1998, pp. 833-840.

Peng, C., et al., "Digital Television Application Manager", 2001 International Conf. on Multimedia and Expo, Tokyo, Japan, Aug. 22-25, 2001, pp. 685-688.

Rath, Kamlesh, et al., "Set-Top Box Control Software: A Key Component in Digital Video", Philips Journal of Research, vol. 50, No. 1/2, © 1996, pp. 185-199.

* cited by examiner

SYSTEM AND ASSOCIATED METHODS FOR REMOTELY ENABLING FEATURES

CROSS-REFERENCE TO RELATED APPLICATIONS

This application is a continuation of U.S. application Ser. No. 12/721,847, filed Mar. 11, 2010, which is a continuation of U.S. application Ser. No. 11/017,794, filed Dec. 22, 2004, which are incorporated by reference in their entirety.

TECHNICAL FIELD

The present invention relates to systems and methods for remotely enabling one or more features. The features may be features in an application loaded on a client, which are remotely enabled from a server.

BACKGROUND OF THE INVENTION

Devices such as cell phones, PDAs, cable boxes and other devices often have a plurality of features that a particular user may or may not desire to use with the device. These features may be included within an application, such as a software application, stored in memory on the device, such that they may be selectively activated. A user will usually select such features upon purchasing the device, such as with a cell phone, or upon signing up for a service, such as with cable television. The features are typically set in the device before it is given to the user. It would be advantageous if the features could be selectively enabled and/or disabled from a remote location.

Providers of video, audio, or other content, such as phone or cable companies, are converting from analog delivery systems to more sophisticated digital delivery systems. These systems are being deployed, and will, over time, phase out the analog delivery systems. For example, cable companies are offering digital set top boxes to customers, that offer more viewing choices to the customer. These digital set top boxes may offer additional features and services such as additional channels, interactive user interfaces, digital programming, pay-per view, video-on-demand, subscription video-on-demand, etc.

Many providers of such video content provide to users in more than one geographic area. The providers are now offering content such as weather or traffic conditions that may be different for users in different geographic areas. It would be beneficial if this information could be individualized to the particular customer.

Additionally, such content providers may employ diagnostics in a set top box provided to the customer. This often involves pre-installing diagnostic software or code on each set top box, or downloading the diagnostics to each set top box. As the diagnostics become more and more complex, often with multiple levels of diagnostics, the software uses more memory and computational resources. The diagnostics are often run from a remote location, such as a head end. Such use makes it difficult to program each user's box individually with the appropriate level of diagnostics. It would be advantageous if different levels of diagnostics could be selectively enabled and disabled from a remote location.

SUMMARY OF THE INVENTION

A method and apparatus enables a feature among a plurality of features in an application loaded on a client, with the client located remotely from a server. The server receives a data profile request from the client. In response to the data profile request, a data profile is sent from the server to the client, the data profile including a profile key to identify the client, an application identification to identify the application, and a feature selector. The application uses the feature selector to enable the feature among the plurality of features.

DETAILED DESCRIPTION

The present invention enables a feature among a plurality of features in an application loaded on a client, with the client located remotely from a server. The server receives a data profile request from the client. In response to the data profile request, a data profile is sent from the server to the client, the data profile including a profile key to identify the client, an application identification to identify the application, and a feature selector. The application uses the feature selector to enable the feature among the plurality of features.

Figure 1:
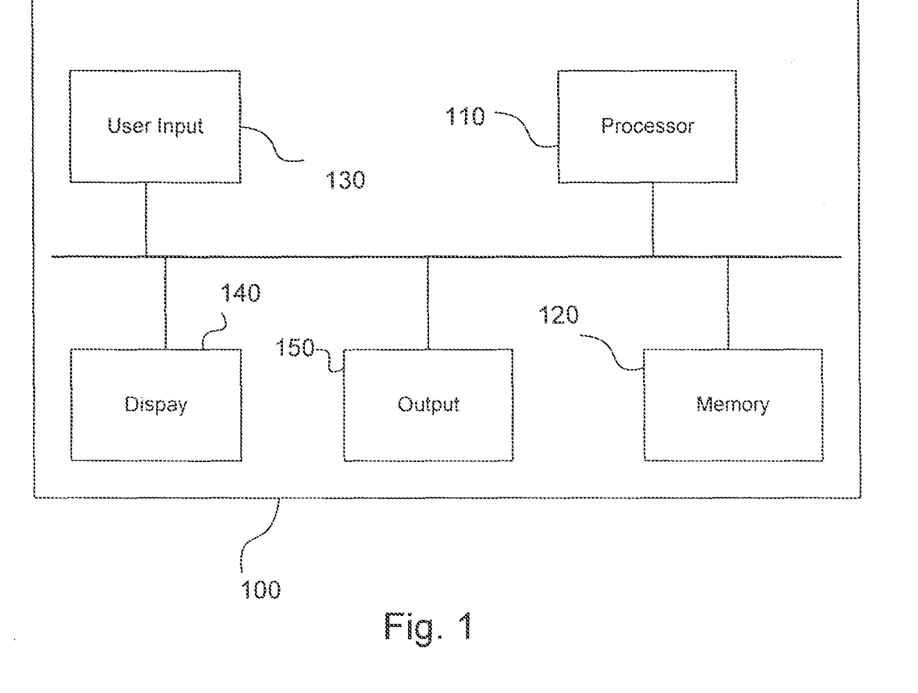
FIG. 1 is a block diagram in accordance with an embodiment of the present invention.

FIG. 1 depicts a block diagram of an embodiment of the present invention. Computing device 100 is suitable for use with the present invention. The computing device 100 may include a processor 110, a memory 120, an user input 130, a display 140, and an output 150. The memory 120 may contain software to be run in conjunction with processor 110, and may cause images to be displayed on display 140. The software is specifically designed to cause computing device 100 to implement the present invention. Computing device 100 may be one of various types of computing devices, such as a workstation, a personal computer, a server, a head-end in a cable system, set top box, home media gateway, or any other type of computing device.

The processor 110 may be a general-purpose microprocessor, such a Pentium series microprocessor manufactured by the Intel Corporation of Santa Clara, Calif. In another embodiment, the processor 110 can be an Application Specific Integrated Circuit (ASIC), which has been designed to implement in its hardware and/or firmware at least a part of a method in accordance with embodiments of the present invention.

Memory 120 can be any device capable of storing analog or digital information, such as a hard disk, Random Access Memory (RAM), Read Only Memory (ROM), flash memory, a compact disk, a magnetic tape, a floppy disk, and any combination thereof, for example.

User input 130 can be any type of input device, such as a keyboard, keypad, pointing device, microphone, mouse, wired or wireless remote control, touch pad, touch screen, a port(s) to attach other input devices, voice recognition software, etc. Any type of input device will function in accordance with embodiments of the present invention.

The display 140 can be any type of display or screen that is capable of displaying images. For example, the display may be a CRT or LCD monitor, a heads-up display, a television, etc. The display 140 may be structurally included as part of the electronic device, or may be physically separated from but connected with the other components of device 100, such as a monitor in a desktop computer. The output 150 can be any type of output, such as a serial port, a wireless output, a connection to a cable modem, an infrared output, etc.

Figure 2:
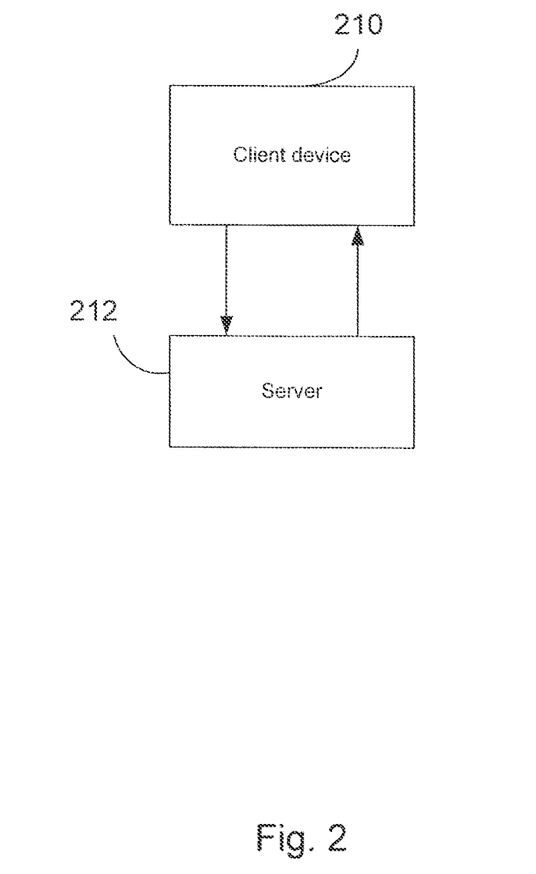
FIG. 2 is a block diagram in accordance with an embodiment of the present invention.

FIG. 2 depicts a block diagram of an embodiment of the present invention. The client device 210 may correspond to the computing device 100 of FIG. 1, and may include a processor 110, the memory 120, the user input 130, the display 140, and the output 150, as well as other computer elements. The server 220 may include the same elements. The client device 210 may be programmed with software in memory to carry out the present invention. The client device 210 is remote from the server 212. The client device may be a device such as a cell phone, a set top box in a cable television system, a PDA, a computer, or other type of electronic device. The server 212 may be a server located at a service provider location, for example, or another server programmed to carry out the present invention. For example, the server 212 could be a server located at a mobile phone service provider location, an Internet service provider location, or a cable television service provider location. The server 212 may communicate with the client device 210 in any way, such as wirelessly, over satellite, over telephone lines, over a cable television connection, etc. The means of communication between the client device 210 and the server 212 is not a critical part of the invention. The server 212 may be connected to a plurality of the client devices in a network.

The present invention allows a user to select features to be enabled. The user may select such features using the user input 130 in conjunction with display 140 by accessing programming that has been loaded into memory 120, with the programming being run by processor 110. For example, the user may be able to call up a display of available features, and select one or more features that the user wishes to be enabled. In response to such a selection of one or more features, the programming loaded into the client device 210 will generate a data profile request, which is sent to the server 212. The data profile request will indicate which client device is sending the data profile request, and which features are desired to be enabled. As an alternative, the data profile request could be sent from the client device 210 to the server every time the client device is powered up, for example.

The client device may include one or more applications, which may be in the form of computer programs, stored in the memory 120. The applications may be stored on the client device 210 in advance, or may be downloaded or otherwise loaded into the client device at a later time. The applications may include features that are selectively enabled on the client device 210.

Upon receipt of the data profile request at the server 212, the server 212 generates a data profile, which includes a profile key, an application key, and a feature selector. The profile key identifies which client the data request is generated for. Thus, if the data profile is broadcast to a plurality of clients in a network such as a mobile phone or cable television network, each client will check the profile key to determine if it is destined for that particular client device. If it is not destined for that particular client device, it is disregarded and not used.

If the profile key indicates that it is designated for that particular client device, the client device 210 will examine the application identification to determine which among a plurality of applications it may apply to. Then, the client device will examine the feature selector included in the data profile, to determine which features should be enabled. The programs on the client device will then enable the desired features The present invention may also be used to enabled features that are not selected at the client device 210, but are selected at the server 212. For example, when the client device is powered on, it may send a data profile to the server 212, which will identify the client device. The server may be used to selectively enable features at one client device or at a group of client devices. For example, it may be determined that all client devices in a particular area should have a feature enabled. Such a feature could be a display of weather data or other data particular to that geographical area. In this case, the profile key could include identifying information particular to the geographical area, such as zip code, or could include an identification code for each client device 212. The feature may then be enabled at each client device 210.

This invention is particularly useful for remote diagnostics. For example, an application loaded on the client device may be a remote diagnostics application. The application may contain a plurality of diagnostic levels. The diagnostic levels may be prestored in memory of the client device 210, or may be loaded therein from the server 212 or from another location. In this way, the server can remotely set different diagnostic levels to be run on the client device 210. For example, the server 212 may access the client 210 and send a first diagnostic level. The server 212 may send a second diagnostic level. Any number of such diagnostic levels may be used. The server 212 may then receive from the client device results of the diagnostics and continue other diagnostic levels as required.

Figure 3:
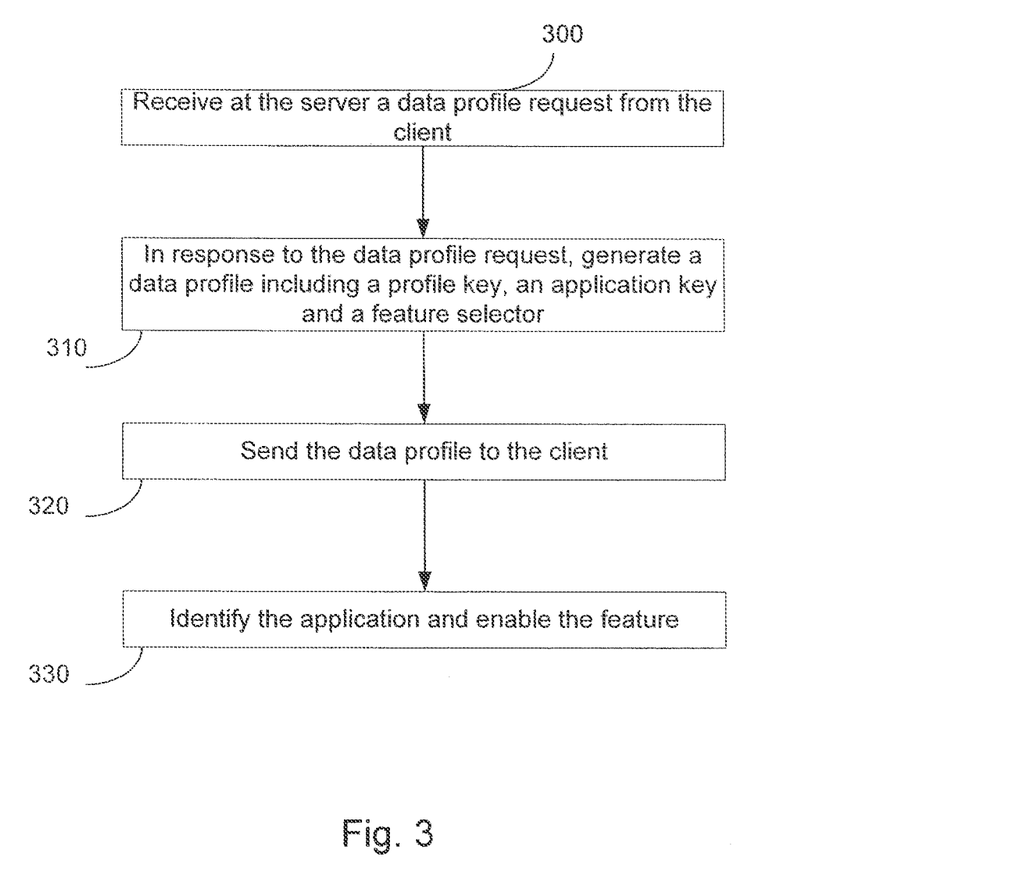
FIG. 3 is a flowchart in accordance with an embodiment of the present invention.

FIG. 3 is a flow chart illustrating steps carried out by an embodiment of the present invention. In step 300, the client device sends a data profile request to the server. As explained above, the data profile request will identify the client, and may include an indication of a feature or features that need to be enabled.

In step 310, in response to the data profile request, the server generates a data profile. The data profile includes a profile key, an application key and a feature selector. The profile key identifies the particular client, so that if the server is connected to more than one client, the client can determine whether the data profile is for that particular client. The profile key may identify more than one client. The application key identifies a particular application, so that if more than one application is on the client, the appropriate application made be determined. The feature selector identifies which feature should be enabled by the client. The server may generate more than one data profile, and may broadcast the data profile to multiple clients in a network, for example.

Figure 4:
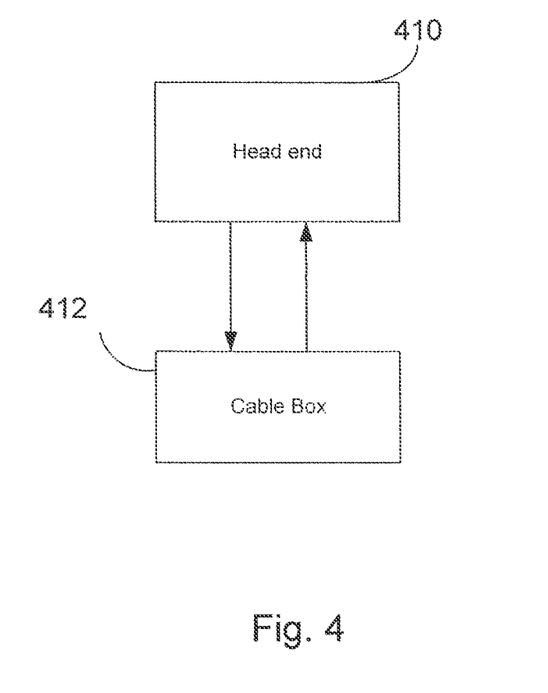
FIG. 4 is a block diagram in accordance with an embodiment of the present invention.

FIG. 4 illustrates a block diagram of an embodiment of the present invention. In this embodiment that is used with a cable television system, a head end 410 corresponds to the remote computing device 210 of FIG. 2. The head end may 410 comprise a server such as the one illustrated in FIG. 2, or may be another type of computing device. The head end and the cable box 412 may each comprise a computing device such as computing device 100, and may include additional computing elements. The head end 410 is located remotely from cable box 412, which is typically located at a user premises. The cable box 412 could alternatively be a type of device such as a personal computer, etc. The head end 410 and the cable box 412 carry out the process described below in conjunction with FIG. 5 so as to enable features on cable box 412.

Figure 5:
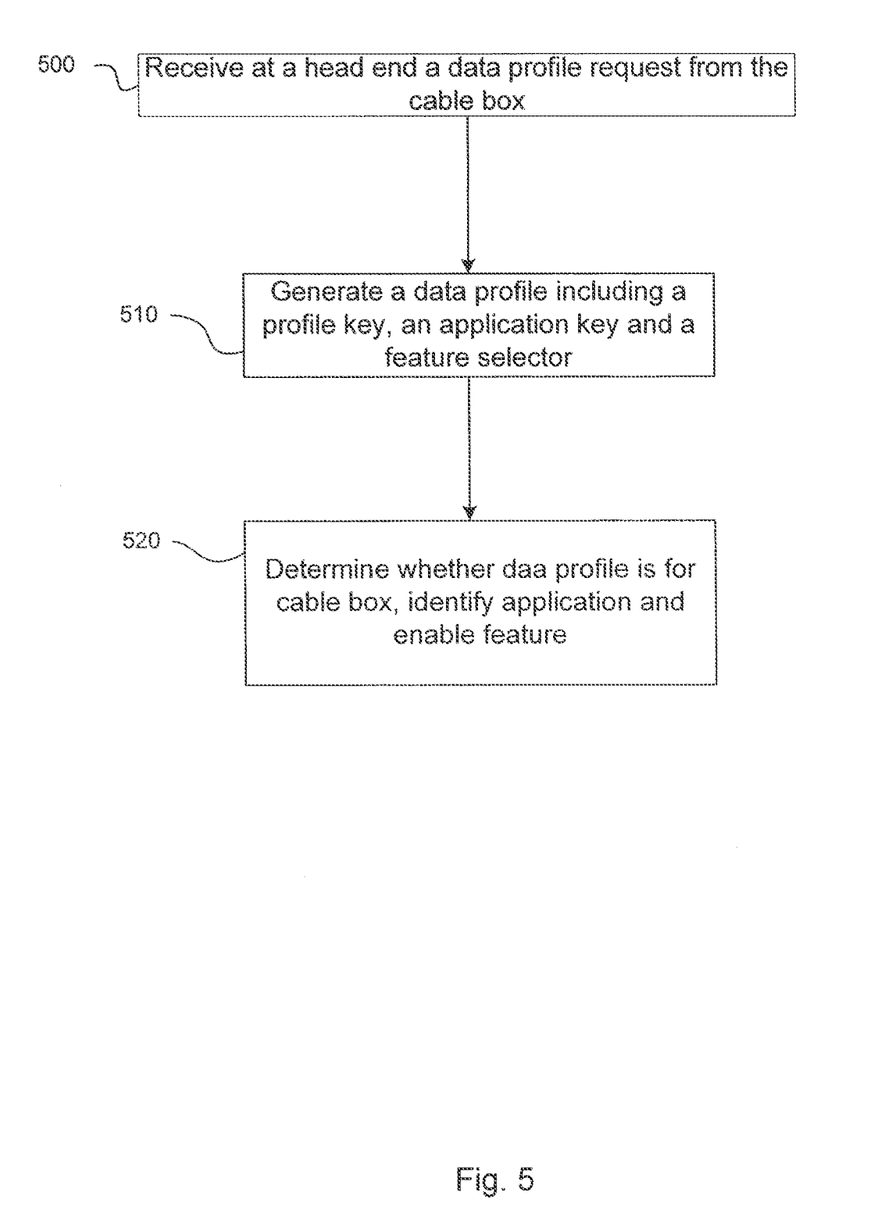
FIG. 5 is a flowchart in accordance with an embodiment of the present invention.

FIG. 5 illustrates a flowchart in accordance with embodiments of the present invention. In step 500, the present invention sends a data profile request from the cable box 412 to the head end 410 at a remote location. The data profile may be sent when the cable box 412 is powered on, at regular intervals, when a user indicates that a new feature or service is desired, or at other times. As described above, the head end 410 may be accessed by any means.

In step 510, the head end 410 receives the data profile request, and generates the data profile, which is sent to the cable box 412. The data profile includes the profile key, the application key and the feature selector as described above.

In step 520, the cable box 412 determines whether the data profile should be used, by examining the profile key as described above. If the data key indicates that the data profile is for that particular cable box, the cable box 412 examines the application key to determine which application should be used, and uses the feature selector to enable the appropriate feature.

In the embodiments described herein, the data profile request, and the data profile, including the profile key, the application key and the feature selector may be implemented in various known ways to send the appropriate information. For example, these items may be sent in a digital message, with certain portions of the message designated to include each of the required bits of information. The information may then be appropriately determined by the above-described computing elements and appropriate software using methods well known to those of ordinary skill in these arts.

Several embodiments of the present invention are specifically illustrated and described herein. However, it will be appreciated that modifications and variations of the present invention are covered by the above teachings and within the purview of the appended claims without departing from the spirit and intended scope of the invention.

What is claimed is:

1. A method of enabling a particular feature from among a plurality of features contained in an application loaded on at least one computing device in a communication network, the at least one computing device located remotely from a computing device server, the method comprising:
   receiving a first data profile request from a first computing device, the first data profile request identifying the first computing device and at least one particular feature from among the plurality of features contained in the application loaded on the first computing device to be selectively enabled;
   at the computing device server, generating and transmitting a first data profile based on the received first data profile request, the first data profile identifying the first computing device and at least one feature contained in an application loaded on the first computing device to be enabled, wherein generating and transmitting a first data profile based on the first data profile request includes:
      generating and transmitting therewith a digital message comprising a first portion receivable and readable by all computing devices in the communication network, the first portion comprising a profile key to identify the first computing device and a second portion receivable and readable only by the first computing device that generated the corresponding first data profile request, the second portion identifying the application loaded on the first computing device and the at least one particular feature to be enabled; and
   enabling on the first computing device the at least one particular feature contained in the second portion of the digital message after the first computing device receives the first data profile and checks that the first data profile is in response to the first computing device's corresponding first data profile request.

2. The method of claim 1, wherein the first computing device corresponds to a group of computing devices, each making a similar first data profile request and the plurality of features being selected from any combination of interactive user interfaces, pay-per-view programming, video-on-demand programming, and subscription video-on-demand programming.

3. The method of claim 2, wherein the transmitted first data profile identifying the first computing device identifies the group of computing devices.

4. The method of claim 2, wherein the first computing device is selected from the group consisting of a client device, an electronic device, and a digital delivery system.

5. The method of claim 2 further comprising:
   receiving a second data profile request from a second computing device, the second data profile request identifying the second computing device and at least one particular feature from among the plurality of features contained in an application loaded on the second computing device to be selectively enabled, wherein at least one of the features contained in the application loaded on the second computing device in the second data profile request differs from at least one of the features contained in the application loaded on the first computing device in the first data profile request;
   at the computing device server, generating and transmitting a second data profile based on the received second data profile request, the second data profile identifying the second computing device and at least one feature contained in the application loaded on the second computing device to be enabled, wherein generating and transmitting a second data profile based on the second data profile request includes:
      generating and transmitting therewith a second digital message comprising a first portion receivable and readable by all computing devices in the communication network, the first portion comprising a profile key to identify the second computing device and a second portion receivable and readable only by the second computing device that generated the corresponding second data profile request, the second portion identifying the application loaded on the second computing device and the at least one particular feature to be enabled; and
   enabling on the second computing device the at least one particular feature contained in the second portion of the second digital message after the second computing device receives the second data profile and checks that the second data profile is in response to the second computing device's corresponding second data profile request.

6. The method of claim 5, wherein the second computing device corresponds to a group of computing devices, each making a similar second data profile request.

7. The method of claim 6, wherein the transmitted second data profile identifying the second computing device identifies the group of computing devices.

8. A method of enabling a particular feature from among a plurality of features contained in an application loaded on at least one computing device in a communication network, the at least one computing device located remotely from a computing device server, the method comprising:
   receiving a first request from a first computing device of the at least one computing device, the received first request identifying the first computing device and at least one particular feature from among the plurality of features contained in the application loaded on the first computing device to be selectively enabled;
   at the computing device server, generating and transmitting a first digital message to enable the at least one particular feature, the first digital message comprising a first portion comprising a profile key to identify the first computing device and a second portion identifying the application and the at least one particular feature to be enabled on the first computing device, and, wherein the first portion is receivable and readable by all computing devices in the communication network and the second portion is receivable and readable only by the first computing device; and at the first computing device, after checking that the first portion of the first digital message identifies the first computing device, receiving the second portion of the first digital message and enabling the at least one identified particular feature contained in the application loaded on the first computing device.

9. The method of claim 8, wherein the request from the first computing device of the at least one computing device is generated and transmitted when the first computing device is powered on.

10. The method of claim 8, wherein the plurality of features being selected from any combination of interactive user interfaces, pay-per-view programming, video-on-demand programming, and subscription video-on-demand programming.

11. The method of claim 8, wherein the first computing device is selected from the group consisting of a client device, an electronic device, and a digital delivery system.

12. The method of claim 8, wherein the first computing device corresponds to a group of computing devices.

13. The method of claim 12, wherein the transmitted first data profile identifying the first computing device identifies the group of computing devices.

14. The method of claim 8 further comprising:

receiving a second request from a second computing device, the received second request identifying the second computing device and at least one particular feature from among the plurality of features contained in the application loaded on the second computing device to be selectively enabled;

at the computing device server, generating and transmitting a second digital message to enable the at least one particular feature, the second digital message comprising a first portion comprising a profile key to identify the second computing device and a second portion identifying the application and the at least one particular feature to be enabled on the second computing device, and, wherein the first portion is receivable and readable by all computing devices in the communication network and the second portion is receivable and readable only by the second computing device; and at the second computing device, after checking that the first portion of the second digital message identifies the second computing device, receiving the second portion of the second digital message and enabling the at least one identified particular feature contained in the application loaded on the second computing device.

* * * * *